US009957926B2

(12) United States Patent
Kim

(10) Patent No.: US 9,957,926 B2
(45) Date of Patent: May 1, 2018

(54) COOLING SYSTEM PROVIDED WITH INTERCOOLER AND CONTROL METHOD THEREOF

(71) Applicant: Hyundai Motor Company, Seoul (KR)

(72) Inventor: Won Sup Kim, Incheon (KR)

(73) Assignee: Hyundai Motor Company, Seoul (KR)

( * ) Notice: Subject to any disclaimer, the term of this patent is extended or adjusted under 35 U.S.C. 154(b) by 70 days.

(21) Appl. No.: 14/822,542

(22) Filed: Aug. 10, 2015

(65) Prior Publication Data
US 2016/0115915 A1  Apr. 28, 2016

(30) Foreign Application Priority Data
Oct. 22, 2014  (KR) .................. 10-2014-0143386

(51) Int. Cl.
| | | |
|---|---|---|
| *F02M 41/04* | (2006.01) | |
| *F02M 31/04* | (2006.01) | |
| *F01P 7/16* | (2006.01) | |
| *F02B 29/04* | (2006.01) | |
| *F02M 31/10* | (2006.01) | |

(52) U.S. Cl.
CPC ............ *F02M 31/042* (2013.01); *F01P 7/16* (2013.01); *F02B 29/0443* (2013.01); *F02B 29/0475* (2013.01); *F02B 29/0493* (2013.01); *F02M 31/10* (2013.01); *F02M 31/105* (2013.01);
(Continued)

(58) Field of Classification Search
CPC .............. F02B 29/0437; F02B 29/0443; F02B 29/045; F02B 29/0462; F02B 29/0475; F02B 29/0493; F02M 31/042; F02M 31/10; F02M 31/105; F02M 31/107
See application file for complete search history.

(56) References Cited

U.S. PATENT DOCUMENTS 3,872,835 A  *  3/1975  Deutschmann ............ F01P 3/20
                                                                 123/41.31
4,061,187 A  *  12/1977  Rajasekaran ............. F01P 3/20
                                                                 123/41.29
(Continued)

FOREIGN PATENT DOCUMENTS

| JP | 2001-173444 A | 6/2001 |
|---|---|---|
| JP | 2005-2983 A | 1/2005 |

(Continued)

*Primary Examiner* — Hung Q Nguyen
*Assistant Examiner* — Kevin R Steckbauer
(74) *Attorney, Agent, or Firm* — Morgan, Lewis & Bockius LLP

(57) ABSTRACT

A cooling system may include an intercooler configured to heat-exchange a coolant and air, a radiator configured to cool a coolant heated in an engine through heat-exchange with air, a low temperature radiator configured to cool the coolant of the intercooler, a thermostat selectively fluid-connected to the radiator or the intercooler to supply the coolant from the radiator or the intercooler to the engine, a first control valve configured to selectively supply the coolant which has passed through the intercooler to the radiator, a second control valve configured to selectively supply the coolant which has passed through the engine to the intercooler or the first control valve, and a controller configured to control operations of the thermostat, the first control valve, and the second control valve according to a temperature of the coolant of the engine and a temperature of intake air.

1 Claim, 5 Drawing Sheets

(52) U.S. Cl.
CPC .......... *F02M 31/107* (2013.01); *Y02T 10/126* (2013.01); *Y02T 10/146* (2013.01)

(56) References Cited

U.S. PATENT DOCUMENTS

| | | | | |
|---|---|---|---|---|
| 4,325,219 A | * | 4/1982 | Stang | F01P 7/165 60/599 |
| 4,697,551 A | * | 10/1987 | Larsen | F01P 3/20 123/41.31 |
| 5,201,285 A | * | 4/1993 | McTaggart | F01P 3/20 123/41.29 |
| 6,230,668 B1 | * | 5/2001 | Marsh | F01P 7/165 123/41.44 |
| 6,604,515 B2 | * | 8/2003 | Marsh | F01P 7/165 123/41.31 |
| 7,131,403 B1 | * | 11/2006 | Banga | F01P 7/165 123/196 AB |
| 8,601,986 B2 | * | 12/2013 | Faulkner | F01P 7/165 123/41.29 |
| 9,303,549 B2 | * | 4/2016 | Chellan | F01P 7/10 |
| 9,366,176 B2 | * | 6/2016 | Faulkner | F01P 7/165 |
| 9,739,194 B2 | * | 8/2017 | Kuske | F02B 29/045 |
| 2002/0195090 A1 | * | 12/2002 | Marsh | F01P 7/165 123/563 |
| 2011/0214627 A1 | * | 9/2011 | Nishikawa | F01P 7/04 123/41.02 |
| 2012/0234266 A1 | * | 9/2012 | Faulkner | F01P 3/12 123/41.1 |
| 2014/0060463 A1 | * | 3/2014 | Faulkner | F01P 3/12 123/41.1 |
| 2014/0123917 A1 | * | 5/2014 | Chellan | F01P 7/10 123/41.04 |
| 2014/0245735 A1 | * | 9/2014 | Kuske | F02B 29/0443 60/599 |
| 2015/0369179 A1 | * | 12/2015 | Hotta | F02D 41/0007 123/568.12 |
| 2016/0003127 A1 | * | 1/2016 | Sakagawa | F01P 3/12 123/41.1 |
| 2016/0305309 A1 | * | 10/2016 | Takahashi | F01P 7/165 |

FOREIGN PATENT DOCUMENTS

| | | |
|---|---|---|
| JP | 2013-104314 A | 5/2013 |
| JP | 2013-113118 A | 6/2013 |
| JP | 2015-86778 A | 5/2015 |
| KR | 10-2012-0062095 A | 6/2012 |
| KR | 10-1294424 B1 | 8/2013 |

* cited by examiner

COOLING SYSTEM PROVIDED WITH INTERCOOLER AND CONTROL METHOD THEREOF

CROSS-REFERENCE TO RELATED APPLICATION

The present application claims priority to and the benefit of Korean Patent Application No. 10-2014-0143386 filed on Oct. 22, 2014, the entire contents of which is incorporated herein for all purposes by this reference.

BACKGROUND OF THE INVENTION

Field of the Invention

The present invention relates to a cooling system and a method for controlling the same. Specifically, the present invention relates to a cooling system in which an intercooler serves as a heater by supplying temperature-increased air to an engine before the engine is warmed up, and a method for controlling the same.

Description of Related Art

In general, various devices are applied to vehicles in order to increase engine performance and enhance fuel efficiency.

For example, a turbocharger may be a typical device applied to vehicles. In general, the turbocharger is a device for increasing an amount of intake air by using energy of exhaust gas. That is, when a turbine of the turbocharger is forcibly rotated by using exhaust gas, a compressor connected to the turbine is rotated to force intake air into a manifold. In this manner, engine performance and fuel efficiency are improved.

However, since the turbocharger system turbocharges the air, heat is generated, and thus, in order to cool the generated heat, an intercooler is provided. That is, the intercooler is installed between the turbocharger and the intake manifold to cool air heated by the turbocharger and supplies the cooled air to the intake manifold.

However, a related art intercooler only has a function of cooling heated air, and thus it operates only when a temperature of air supplied to the intake manifold is equal to or higher than a preset temperature. That is, when the temperature of the air is lower, the intercooler does not operate.

Meanwhile, in a case in which low-temperature air is mixed with EGR gas and supplied to the intake manifold, a swirl control valve (SCV) may malfunction and a problem may arise with durability thereof. To solve this, an extra device for heating low-temperature air needs to be provided.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a cooling system having advantages of heating air by using an intercooler when a temperature of air supplied to an intake manifold is low, and a method for controlling the same.

An exemplary embodiment of the present invention provides a cooling system including: an intercooler configured to heat-exchange a coolant and air; a radiator configured to cool a coolant heated in an engine through heat-exchange with air; a low temperature radiator configured to cool the coolant of the intercooler; a thermostat selectively connected to the radiator or the intercooler to supply the coolant from the radiator or the intercooler to the engine; a first control valve configured to supply the coolant which has passed through the intercooler to the radiator, or to not supply the coolant thereto; a second control valve configured to selectively supply the coolant which has passed through the engine to the intercooler or the first control valve; and a controller configured to control operations of the thermostat, the first control valve, and the second control valve according to a temperature of the coolant of the engine and a temperature of intake air. The cooling system may further include: a coolant temperature sensor configured to transmit coolant temperature information to the controller; and an intake temperature sensor configured to transmit intake air temperature information of an engine to the controller. The cooling system may further include a low temperature water pump configured to circulate a coolant between the low temperature radiator and the intercooler.

When the coolant temperature is lower than a preset coolant temperature, the controller may block the coolant introduced from the radiator, and control the thermostat to supply the coolant introduced from the intercooler to the engine, control the first control valve such that the coolant which has passed through the intercooler is not transmitted to the radiator, open the second control valve only in the passage connected from the engine to the intercooler, and maintain the low temperature water pump in a deactivated state.

When the coolant temperature is higher than the preset coolant temperature and the temperature of the intake air is lower than the target set temperature, the controller may control the thermostat to allow the coolant which has passed through the radiator to pass through the engine and block the coolant introduced from the intercooler, control the first control valve such that the coolant which has passed through the intercooler is transmitted to the radiator, open only the passage of the second control valve connected from the engine to the intercooler, and maintain the low temperature water pump in a deactivated state.

When the coolant temperature is higher than the preset coolant temperature and a temperature of the intake air is higher than a target set temperature, the controller may control the thermostat to open a coolant line connected from the radiator to the engine and block a coolant line connected from the intercooler to the engine, control the first control valve such that the coolant which has passed through the intercooler is not transmitted to the radiator, block the coolant introduced from the engine to the intercooler and connect a cooling line between the second low temperature radiator and the intercooler, and does not operate the low temperature water pump.

Another embodiment of the present invention provides a method for controlling a cooling system including an intercooler configured to heat-exchange a coolant and air and supply the heat-exchanged air to an engine, a radiator configured to cool the coolant heated in the engine through heat-exchange with air, and a low temperature radiator configured to cool the coolant of the intercooler and form a closed circuit with the intercooler in a fluid manner. The method may include: determining whether the engine is in a warmed-up state on the basis of a coolant temperature of the engine; and when it is determined that the engine is not in a warmed-up state, controlling a flow of the coolant according to a first operation mode.

In the first operation mode, the coolant heated in the engine is supplied to the intercooler to heat air and supply the same to the engine, and the coolant which has passed through the intercooler is supplied back to the engine without going through the radiator or the low temperature radiator.

The method may further include: when it is determined that the engine has been warmed up, determining whether an intake temperature is higher than a target set temperature; and when the intake temperature is lower than the target set temperature, controlling flow of the coolant according to a second operation mode.

In the second operation mode, the coolant heated in the engine may be supplied to the intercooler to heat air and supply the same to the engine, and the coolant which has passed through the intercooler may be supplied back to the engine through the radiator, rather than through the low temperature radiator.

The method may further include, when it is determined that the intake temperature is higher than the target set temperature, controlling a flow of the coolant according to a third operation mode.

In the third operation mode, the coolant heated in the engine may be supplied back to the engine through the radiator, rather than through the intercooler, and the coolant circulating in a closed circuit between the intercooler and the low temperature radiator may be heat-exchanged with air supplied to the engine.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
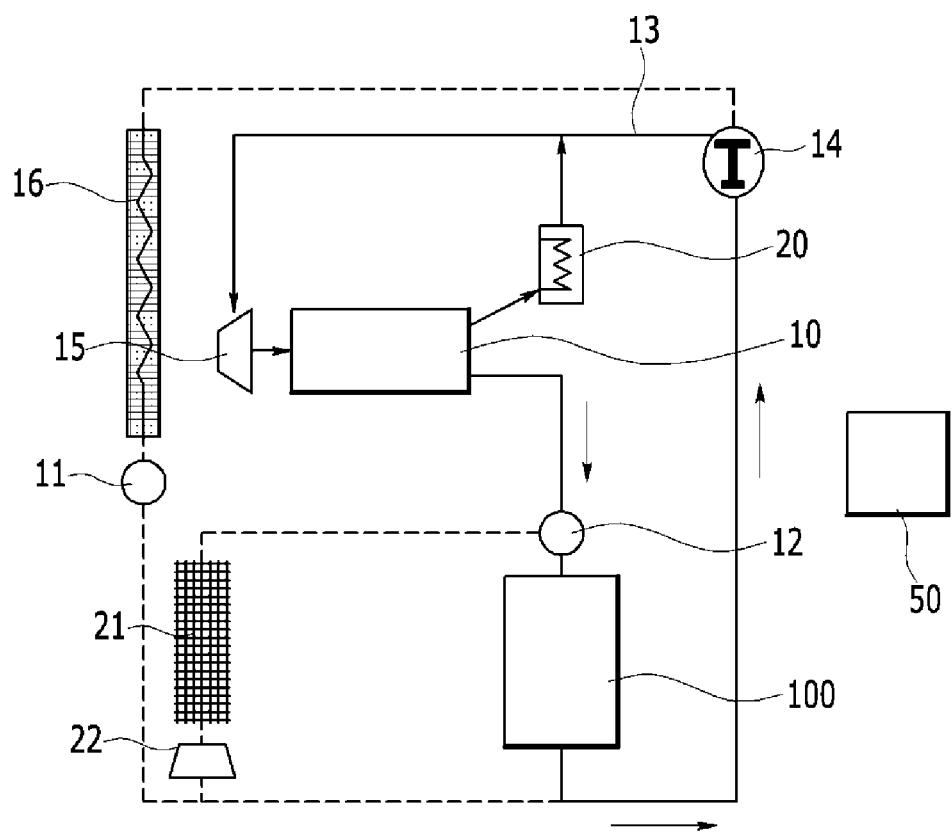
FIG. 1 is a layout view illustrating an operation of a cooling system according to an exemplary embodiment of the present invention before an engine is warmed up.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

In the following detailed description, only certain exemplary embodiments of the present invention have been shown and described, simply by way of illustration. As those skilled in the art would realize, the described embodiments may be modified in various different ways, all without departing from the spirit or scope of the present invention.

Throughout the specification, unless explicitly described to the contrary, the word "comprise" and variations such as "comprises" or "comprising" will be understood to imply the inclusion of stated elements but not the exclusion of any other elements.

Like reference numerals designate like elements throughout the specification.

An exemplary embodiment of the present invention will hereinafter be described in detail with reference to the accompanying drawings.

FIG. 1 is a layout view illustrating an operation of a cooling system according to an exemplary embodiment of the present invention before an engine is warmed up.

Figure 2:
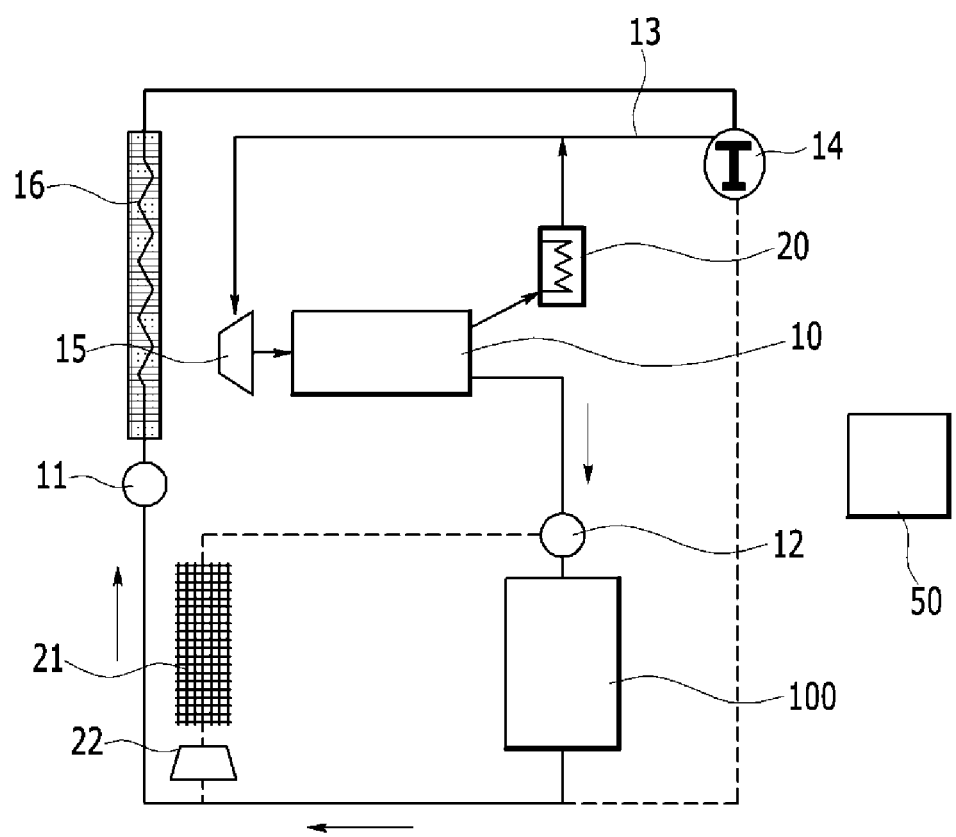
FIG. 2 is a layout view illustrating an operation of the cooling system according to an exemplary embodiment of the present invention when an intake temperature is lower than a target set temperature after the engine is warmed up.

FIG. 2 is a layout view illustrating an operation of the cooling system according to an exemplary embodiment of the present invention when an intake temperature is lower than a target set temperature after the engine is warmed up.

Figure 3:
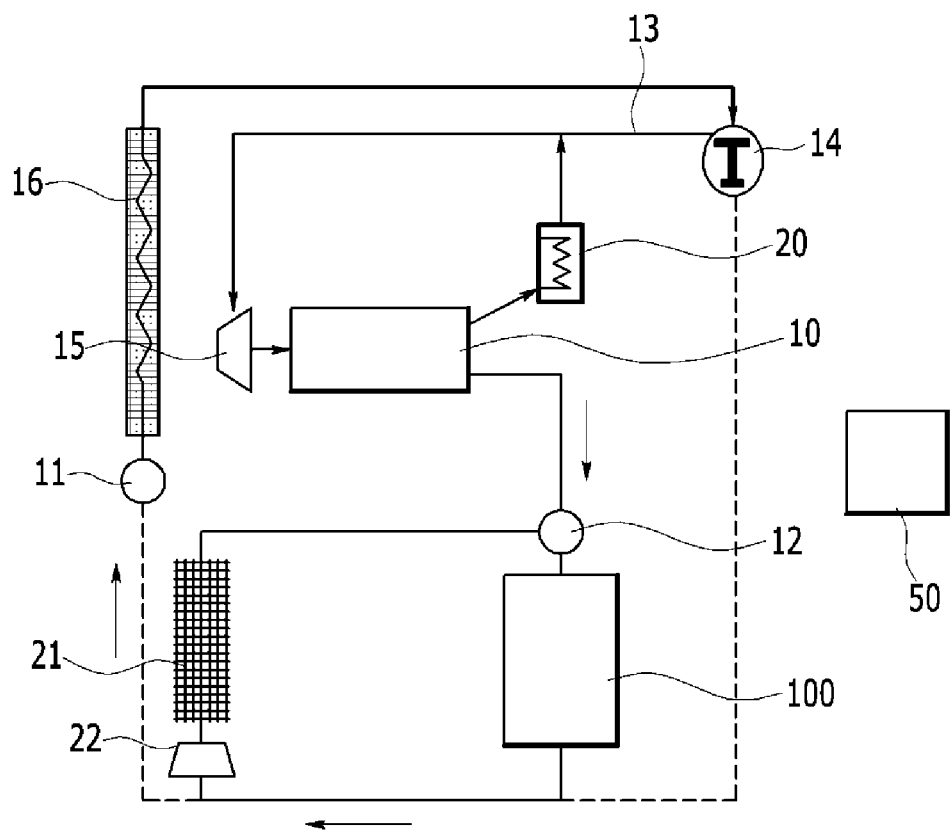
FIG. 3 is a layout view illustrating an operation of the cooling system according to an exemplary embodiment of the present invention when an intake temperature is higher than a target set temperature after the engine is warmed up.

FIG. 3 is a layout view illustrating an operation of the cooling system according to an exemplary embodiment of the present invention when an intake temperature is higher than a target set temperature after the engine is warmed up.

Referring to FIGS. 1 through 3, the cooling system exemplary embodiment of the present invention includes an engine 10, a thermostat 14, a water pump 15, a radiator 16, a turbocharger 20, an intercooler 100, a low temperature radiator 21, and a low temperature water pump 22. The engine 10, the thermostat 14, the water pump 15, the radiator 16, the turbocharger 20, the intercooler 100, the low temperature radiator 21, and the low temperature water pump 22 may be continuously or selectively connected to each other through a coolant line 13.

The engine 10 burns a mixture of air and fuel to convert chemical energy into mechanical energy. The engine 10 heated during the combustion process is cooled by a coolant circulating through the coolant line 13. Some of the coolant heated in the engine 10 is continuously supplied to the water pump 15 through the turbocharger 20, and the remaining amount is selectively supplied to the radiator 16.

The thermostat 14 is selectively connected to the radiator 16 or the intercooler 100 according to temperatures of the coolant of the engine 10, and is continuously connected to the water pump 15 to supply the coolant which has passed through the radiator 16 or the intercooler 100 to the water pump 15.

The water pump 15 supplies the coolant which has passed through the thermostat 14 and the coolant which has passed through the turbocharger 20 to the engine 100.

The radiator 16 is selectively connected to the engine 10 through the coolant line 13 to cool the coolant heated in the engine 100 through heat-exchange with ambient air. Also, the radiator 16 may be selectively connected to the intercooler 100 to supply the coolant which has passed through the intercooler 100 to the engine 10.

The turbocharger 20, serving to turbocharge intake air by using exhaust gas, is connected to the engine 10 and the water pump 15. Thus, the coolant discharged from the engine 100 may pass through the turbocharger 20 and is subsequently supplied to the water pump 15.

The intercooler 100 cools the intake air which has passed through the turbocharger 20. The intercooler 100 may be selectively connected to the engine 10 and selectively receive the coolant heated in the engine 10. Also, the intercooler 100 is selectively connected to the thermostat 14, the low temperature radiator 21, or the radiator 16, and selectively supplies the coolant to the thermostat 14, the low temperature radiator 21, or the radiator 16.

The low temperature radiator 21 is selectively connected to the intercooler 100 through a single path to cool the coolant which has passed through the intercooler 100 through heat-exchange with ambient air.

The low temperature water pump 22 circulates the coolant between the low temperature radiator 21 and the intercooler 100.

The cooling system further includes a first control valve 11 and a second control valve 12 for switching the coolant line 13. As the first and second valves 11 and 12, 3-way valves may be used.

The first control valve 11 is configured to selectively supply the coolant which has passed through the intercooler 100 to the radiator 16.

The second control valve 12 is configured to selectively supply the coolant which has passed through the engine 10 to the intercooler 100 or the first control valve 11.

The cooling system further includes a controller 50 for controlling the thermostat 14, the first and second control valves 11 and 12, and the low temperature water pump 22. The controller 50 may be realized as one or more processors operated by a preset program, and the preset program may be programmed to perform each step of a method for controlling a cooling system according to an exemplary embodiment of the present invention.

Figure 4:
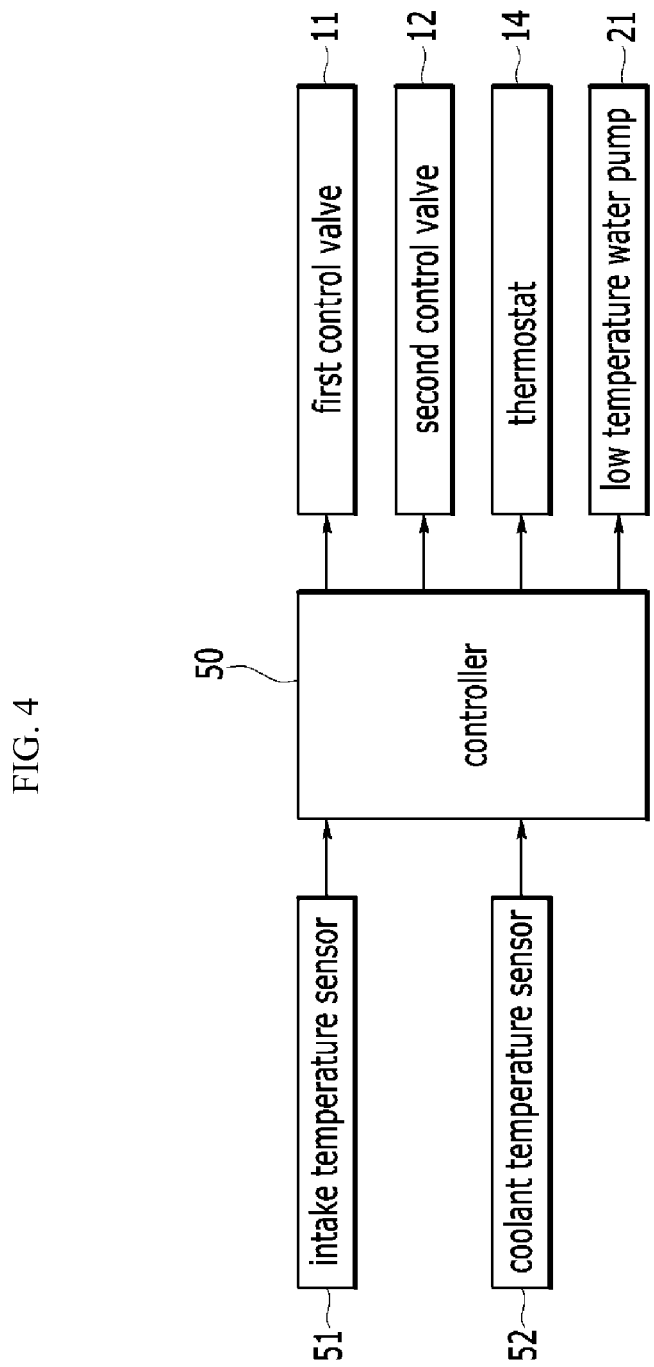
FIG. 4 is a block diagram of the cooling system according to an exemplary embodiment of the present invention.

FIG. 4 is a block diagram of the cooling system according to an exemplary embodiment of the present invention.

As illustrated in FIG. 4, the cooling system further includes an intake temperature sensor 51 and a coolant temperature sensor 52.

The intake temperature sensor 51 is installed in an air line between the turbocharger 20 and the engine 10 to measure a temperature of intake air supplied to the engine 10 after passing through the turbocharger 20, and transmits corresponding information to the controller 50.

The coolant temperature sensor 52 is installed in a preset position in the coolant line 13 to measure a temperature of the coolant, and transmits the corresponding information to the controller 50. The preset position may be a position between the engine 10 and the turbocharger 20, but the present inventive concept is not limited thereto.

The controller 50 controls operations of the first and second control valves 11 and 12, the thermostat 14, and the low temperature water pump 22 on the basis of information regarding the temperature of the intake air transmitted from the intake temperature sensor 51 and the information regarding the coolant temperature transmitted from the coolant temperature sensor 52.

FIG. 1 illustrates an operation when the coolant temperature transmitted from the coolant temperature sensor 52 is lower than the preset coolant temperature.

When the coolant temperature transmitted from the coolant temperature sensor 52 is lower than the preset coolant temperature, the controller 50 determines that the engine 10 has not been warmed up.

When it is determined that the engine 10 has not been warmed up, the first control valve 11 closes the coolant passage connected from the intercooler 100 to the radiator 16. Also, the second control valve 12 opens only the coolant passage connected from the engine 10 to the intercooler 100. Here, the controller 50 does not operate the low temperature water pump 22 but allows the coolant to pass through the intercooler 100 from the engine 10. The coolant which has passed through the intercooler 100 is introduced to the thermostat 14. The thermostat 14 blocks the coolant introduced from the radiator 16 and supplies the coolant introduced from the intercooler 100 to the engine 10 to allow the coolant to circulate. Thus, the coolant heated in the engine 10 is heat-exchanged with air in the intercooler 100 to heat the air, and the heated air is supplied to the engine 10. Also, since the coolant heated in the engine 10 is supplied back to the engine 10, rather than passing through the radiator 16, the coolant and the engine 10 may be rapidly warmed up.

In the following descriptions, an operation in which a coolant temperature transmitted from the coolant temperature sensor 52 is lower than a preset coolant temperature will be referred to as a first operation mode.

FIG. 2 is a layout view illustrating an operation of the cooling system according to an exemplary embodiment of the present invention when an intake temperature is lower than a target set temperature after the engine is warmed up.

When the coolant temperature transmitted from the coolant temperature sensor 52 is higher than the preset coolant temperature, the controller 50 determines that the engine 10 has been warmed up. In this case, the controller 50 determines whether a temperature of an intake air transmitted from the intake temperature sensor 51 is lower than a target set temperature. When the temperature of the intake air transmitted from the intake temperature sensor 51 is lower than the target set temperature, the controller 50 adjusts the first control valve 11 to allow the coolant which has passed though the intercooler 100 to flow the radiator 16. The controller 50 also controls the second control valve 12 to connect the coolant line between the engine 10 and the intercooler 100. Here, the low temperature water pump 22 is maintained in a deactivated state, and the thermostat 14 is open to allow the coolant which has passed through the radiator to flow the engine 10, and the coolant introduced from the intercooler 100 introduced to the thermostat 14 is blocked. Accordingly, the coolant cooled while passing through the radiator 16 is supplied to the warmed-up engine 10 to lower a temperature of the engine 10, since the coolant heated in the engine 10 is heat-exchanged with air in the intercooler 100 to heat the air and supply the same to the engine 10.

In the following descriptions, an operation when the temperature of the intake air is lower than the target set temperature after the engine 10 is warmed up will be referred to as a second operation mode.

FIG. 3 is a layout view illustrating an operation of the cooling system according to an exemplary embodiment of the present invention when the temperature of the intake air is higher than the target set temperature after the engine 10 is warmed up.

When the temperature of the intake air transmitted from the intake temperature sensor 51 is higher than the target set temperature after the engine 10 is warmed up, the first control valve blocks introduction of the coolant from the intercooler 100 to the radiator 16 under the control of the controller 50. Also, the controller 50 controls the second control valve 12 to block the coolant introduced from the engine 10 to the intercooler 100 and connects the coolant line between the low temperature radiator 21 and the intercooler 100. In this case, the controller 50 operates the low temperature water pump 22 to allow the coolant heat-exchanged with air in the intercooler 100 to circulate among the low temperature radiator 21, the intercooler 100, and the low temperature water pump 22. Thus, the air is heat-exchanged with the coolant cooled in the low temperature radiator 21, rather than heat-exchanging with the coolant heated in the engine 10, so as to be cooled.

The thermostat 14 opens the coolant line connected from the radiator 16 to the engine 10 and closes the coolant line connected from the intercooler 100 to the engine 10. Accordingly, since the coolant cooled in the radiator 16 is supplied to the engine 10, the engine 10 is prevented from being heated. In the following descriptions, an operation when the temperature of intake air is higher than the target set temperature after the engine 10 is warmed up will be referred to as a third operation mode.

Figure 5:
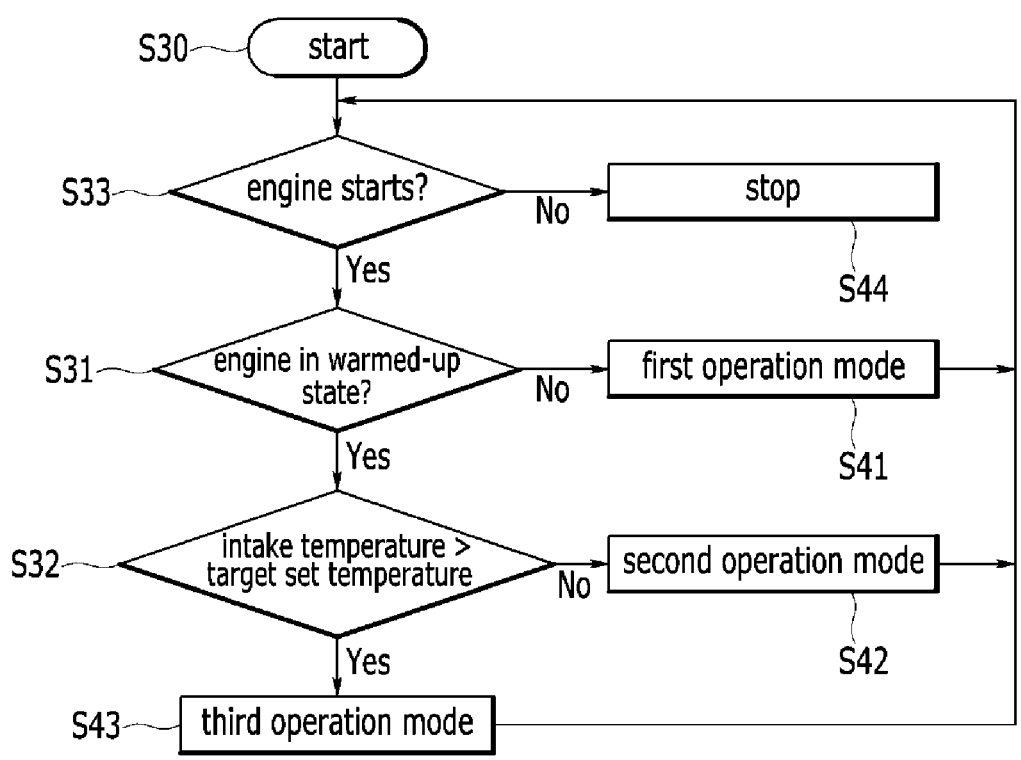
FIG. 5 is a flowchart illustrating a method for controlling a cooling system according to an exemplary embodiment of the present invention.

FIG. 5 is a flowchart illustrating a method for controlling a cooling system according to an exemplary embodiment of the present invention.

As illustrated in FIG. 5, a method for controlling a cooling system according to an exemplary embodiment of the present invention starts by determining whether the engine 10 starts (S33).

When it is determined that the engine 10 does not start in step S33, the method for controlling a cooling system according to an exemplary embodiment of the present invention is terminated (S44).

When it is determined that the engine 10 starts in step S33, the controller 50 determines a warm-up state of the engine 10 on the basis of coolant temperature information transmitted from the coolant temperature sensor 52, and controls accordingly the first control valve 11, the second control valve 12, the thermostat 14, and the low temperature water pump 21. This will be described in detail.

First, the controller 50 compares the coolant temperature transmitted from the coolant temperature sensor 52 with a preset coolant temperature to determine whether the engine 10 is in a warmed-up state (S31).

When it is determined that the coolant temperature is higher than the preset temperature so the engine 10 has not been warmed up, the controller 50 controls the first control valve 11, the second control valve 12, the thermostat 14, and the low temperature water pump 21 according to the first operation mode (S41). As described above, in the first operation mode, the first control valve 11 closes the coolant passage connected from the intercooler 100 to the radiator 18, the second control valve 12 opens only the coolant passage connected from the engine 10 to the intercooler 100, the low temperature water pump 22 does not operate, and the thermostat 14 blocks the coolant introduced from the radiator 16 and supplies the coolant introduced from the intercooler 100 to the engine 10 to allow the coolant to circulate.

When it is determined that the engine 10 is in a warmed-up state in step S31, the controller 50 determines whether a temperature of intake air (or intake temperature) is higher than a target set temperature (S32).

When the temperature of the intake air is lower than the target set temperature, the controller 50 controls the first control valve 11, the second control valve 12, the thermostat 14, and the low temperature water pump 21 according to the second operation mode (S42). As described above, in the second operation mode, the first control valve 11 allows the coolant which has passed through the intercooler 100 to flow in the radiator 16, the second control valve 12 connects the coolant line between the engine 10 and the intercooler 100, the low temperature water pump 22 is maintained in a deactivated state, the thermostat 14 is opened to allow the coolant which has passed through the radiator to flow in the engine 10, and the coolant introduced from the intercooler 100 to the thermostat is blocked.

When the temperature of the intake air is higher than the target set temperature in step S32, the controller 50 controls the first control valve 11, the second control valve 12, the thermostat 14, and the low temperature water pump 22 according to the third operation mode (S43). As described above, in the third operation mode, the first control valve 11 blocks introduction of the coolant from the engine 10 to the intercooler 100, and connects the coolant line between the low temperature radiator 21 and the intercooler 100, and the thermostat 14 opens the coolant line connected from the radiator 16 to the engine 10 and closes the coolant line connected from the intercooler 100 to the engine 10. Also, the controller 50 operates the low temperature water pump 22 to allow the coolant heat-exchanged with air in the intercooler 100 to circulate among the low temperature radiator 21, the intercooler 100, and the low temperature water pump 22.

The method for controlling a cooling system according to an exemplary embodiment of the present invention may be continuously performed in a state in which the engine 10 is in operation.

According to an exemplary embodiment of the present invention, when the temperature of the air supplied to the intake manifold is low, the air is heated by using the intercooler and supplied to the intake manifold, whereby a defective operation of a swirl control valve may be prevented and a fouling phenomenon and an environmental problem may be improved.

Also, since an additional heating apparatus is not used to heat air, production cost does not increase.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. They are not intended to be exhaustive or to limit the invention to the precise forms disclosed, and obviously many modifications and variations are possible in light of the above teachings as well as various alternatives and modifications thereof. It is intended that the scope of the invention be defined by the Claims appended hereto and their equivalents.

What is claimed is:

1. A cooling system comprising:
an intercooler configured to heat-exchange a coolant and air;
a radiator configured to cool a coolant heated in an engine through heat-exchange with air;
a low temperature radiator configured to cool the coolant of the intercooler;
a thermostat selectively fluid-connected to the radiator or the intercooler and selectively supplying the coolant from the radiator or the intercooler to the engine;
a first control valve configured to selectively supply the coolant which has passed through the intercooler to the radiator;

a second control valve configured to selectively supply the coolant which has passed through the engine to the intercooler or the first control valve;

a controller configured to control operations of the thermostat, the first control valve, and the second control valve according to a temperature of the coolant of the engine and a temperature of intake air flowing into the engine;

a coolant temperature sensor configured to transmit information on the temperature of the coolant to the controller;

an intake temperature sensor detecting the temperature of the intake air flowing into the engine and configured to transmit information on the temperature of the intake air of the engine to the controller; and a low temperature water pump configured to circulate a coolant between the low temperature radiator and the intercooler, wherein:
when the temperature of the coolant is lower than a preset coolant temperature,
the controller controls the thermostat to block the coolant introduced from the radiator and controls the thermostat to supply the coolant introduced from the intercooler to the engine,
controls the first control valve such that the coolant which has passed through the intercooler is not transmitted to the radiator,
opens the second control valve only in a passage connected from the engine to the intercooler, and
maintains the low temperature water pump in a deactivated state;

wherein:
when the temperature of the coolant is higher than the preset coolant temperature and the temperature of the intake air is lower than a target set temperature,
the controller controls the thermostat to allow the coolant which has passed through the radiator to pass through the engine and to block the coolant introduced from the intercooler,
controls the first control valve such that the coolant which has passed through the intercooler is transmitted to the radiator,
opens only a passage of the second control valve connected from the engine to the intercooler, and
maintains the low temperature water pump in a deactivated state; and wherein:
when the temperature of the coolant is higher than the preset coolant temperature and the temperature of the intake air is higher than the target set temperature,
the controller controls the thermostat to open a coolant line connected from the radiator to the engine and blocks a coolant line connected from the intercooler to the engine,
controls the first control valve such that the coolant which has passed through the intercooler is not transmitted to the radiator,
controls the second control valve to block the coolant introduced from the engine to the intercooler and connects a cooling line between the second low temperature radiator and the intercooler, and
does not operate the low temperature water pump.

\* \* \* \* \*